United States Patent
Wang

(10) Patent No.: US 12,512,037 B1
(45) Date of Patent: Dec. 30, 2025

(54) IMAGE DISPLAY DEVICE CONFIGURED TO CONVERT ROW DISPLAY DATA INTO UPDATE INSTRUCTIONS, IMAGE TRANSMISSION SYSTEM, AND UPDATING METHOD

(71) Applicant: HIMAX TECHNOLOGIES LIMITED, Tainan (TW)

(72) Inventor: Ming-Chih Wang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/754,193

(22) Filed: Jun. 26, 2024

(51) Int. Cl.
*G09G 3/20* (2006.01)

(52) U.S. Cl.
CPC ....... *G09G 3/2092* (2013.01); *G09G 2340/02* (2013.01); *G09G 2370/00* (2013.01)

(58) Field of Classification Search
None
See application file for complete search history.

(56) References Cited

U.S. PATENT DOCUMENTS

| | | | |
|---|---|---|---|
| 2005/0057472 A1* | 3/2005 | Lee | G09G 3/3611 345/89 |
| 2009/0167657 A1* | 7/2009 | Tomizawa | G09G 5/02 345/87 |
| 2016/0196804 A1* | 7/2016 | Skinner | H04N 19/156 345/543 |
| 2023/0040711 A1* | 2/2023 | Kyles | H10H 29/142 |

FOREIGN PATENT DOCUMENTS

JP         H07230674 A    *  8/1995

* cited by examiner

*Primary Examiner* — Kirk W Hermann
(74) *Attorney, Agent, or Firm* — JCIPRNET

(57) ABSTRACT

An image display device comprises a memory, a control circuit, and a memory controller. The memory is configured to store a setting file of the image display device. The control circuit is configured to receive an image data. The control circuit comprises a code converter configured to convert a plurality of row display data of the image data respectively into a plurality of update instructions, wherein each row display data comprises a plurality of pixel brightness data and each pixel brightness data comprises a plurality of subpixel brightness data, each subpixel brightness data is converted into an update code of the update instruction by determining whether each subpixel brightness data falls within a first brightness range or a second brightness range. The memory controller is configured to update the setting file according to the update code.

21 Claims, 6 Drawing Sheets

| | R | G | B | R | G | B | R | G | B | ... |
|---|---|---|---|---|---|---|---|---|---|---|
| 1st Image Data | 255 | 0 | 255 | 0 | 0 | 0 | 255 | 255 | 0 | ... |
| 3rd Image Data | 220 | 5 | 221 | 10 | 6 | 10 | 221 | 255 | 5 | ... |
| Update Code | 1 | 0 | 1 | 0 | 1 | 0 | 1 | 1 | 0 | ... |

FIG. 2

| | R | G | B | R | G | B | R | G | B | ... |
|---|---|---|---|---|---|---|---|---|---|---|
| 1st Image Data | 255 | 255 | 255 | 0 | 0 | 0 | 255 | 255 | 255 | ... |
| 3rd Image Data | 245 | 253 | 231 | 10 | 8 | 7 | 238 | 235 | 236 | ... |
| Update Code | 1 | | | 0 | | | 1 | | | ... |

FIG. 3

| 1st Image Data | R | G | B | R | G | B | R | G | B | R | G | B | R | G | B | R | G | B | ⋮ |
|---|---|---|---|---|---|---|---|---|---|---|---|---|---|---|---|---|---|---|---|
| | 255 | 255 | 255 | 255 | 255 | 255 | 255 | 255 | 255 | 0 | 0 | 0 | 0 | 0 | 0 | 0 | 0 | 0 | ⋮ |

| 3rd Image Data | 245 | 253 | 231 | 200 | 218 | 217 | 238 | 235 | 236 | 0 | 1 | 0 | 5 | 10 | 15 | 20 | 3 | 11 | ⋮ |

| Update Code | 1 | 0 | ⋮ |

FIG. 4

| | R | G | B | R | G | B | R | G | B | R | G | B | ... | ... |
|---|---|---|---|---|---|---|---|---|---|---|---|---|---|---|
| 1st Image Data | 255 | 255 | 255 | 0 | 0 | 0 | 96 | 96 | 96 | 160 | 160 | 160 | ... | |
| 3rd Image Data | 243 | 225 | 255 | 16 | 08 | 07 | 81 | 104 | 97 | 147 | 149 | 143 | ... | |
| Update Code | 11 | | | 00 | | | 01 | | | 10 | | | ... | |

FIG. 5

IMAGE DISPLAY DEVICE CONFIGURED TO CONVERT ROW DISPLAY DATA INTO UPDATE INSTRUCTIONS, IMAGE TRANSMISSION SYSTEM, AND UPDATING METHOD

BACKGROUND

1. Technical Field

The disclosure generally relates to a device, a system, and a method, more particularly, to an image display device, an image transmission system, and an updating method.

2. Description of Related Art

As the technology evolves, a scale of a display device grows larger, and it becomes relatively hard for such a device to run for a long period without updating a setting file. However, updating to the display device may be troublesome since the update data is usually required to be transmitted through a designated data connection.

SUMMARY

Accordingly, the disclosure is directed to an image display device, an image transmission system, and an updating method which can effectively lower difficulties updating the display device.

The image display device of the present disclosure comprises a memory, a control circuit, and a memory controller. The memory is configured to store a setting file of the image display device, the setting file may be a firmware code, a configuration file, or a combination of the firmware and the configuration file. The control circuit is configured to receive an image data. The control circuit comprises a code converter configured to convert a plurality of row display data of the image data respectively into a plurality of update instructions, wherein each row display data comprises a plurality of pixel brightness data and each pixel brightness data comprises a plurality of subpixel brightness data, each subpixel brightness data is converted into an update code of the update instruction by determining whether each subpixel brightness data falls within a first brightness range or a second brightness range. The memory controller is configured to update the setting file according to the update code.

The image transmission system of the present disclosure comprises an image transmitting device and an image display device. The image transmitting device comprises a processing circuit and a transmitter. The processing circuit is configured to set each subpixel brightness data of a first image data as a first brightness value or a second brightness value according to an update code. The transmitter is configured to perform an image processing operation to convert the first image data into a second image data. The image display device comprises a receiver, a control circuit, and a control circuit. The receiver is configured to perform an image restoration operation on the second image data to generate a third image data having a same data type as the first image data. The control circuit is configured to receive the third image data, and configured to determine whether each subpixel brightness data falls within a first brightness range or a second brightness range to recover the update code. The memory controller is configured to update a setting file stored in a memory according to the update code.

The updating method for updating an image display device of the present disclosure. The image processing method comprises: receiving an image data; converting a plurality of row display data of the image data respectively into a plurality of update instructions, wherein each row display data comprises a plurality of pixel brightness data and each pixel brightness data comprises a plurality of subpixel brightness data, each subpixel brightness data is converted into an update code of the update instruction by determining whether each subpixel brightness data falls within a first brightness range or a second brightness range; and updating a setting file stored in a memory according to the update instructions.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 2 illustrates a first example of a signal diagram of a first image data, a second image data, and a third image data in accordance with some embodiments of the present disclosure.

FIG. 3 illustrates a second example of a signal diagram of a first image data, a second image data, and a third image data in accordance with some embodiments of the present disclosure.

FIG. 4 illustrates a third example of a signal diagram of a first image data, a second image data, and a third image data in accordance with some embodiments of the present disclosure.

FIG. 5 illustrates a fourth example of a signal diagram of a first image data, a third image data, and update codes in accordance with some embodiments of the present disclosure.

DESCRIPTION OF THE EMBODIMENTS

Figure 1:
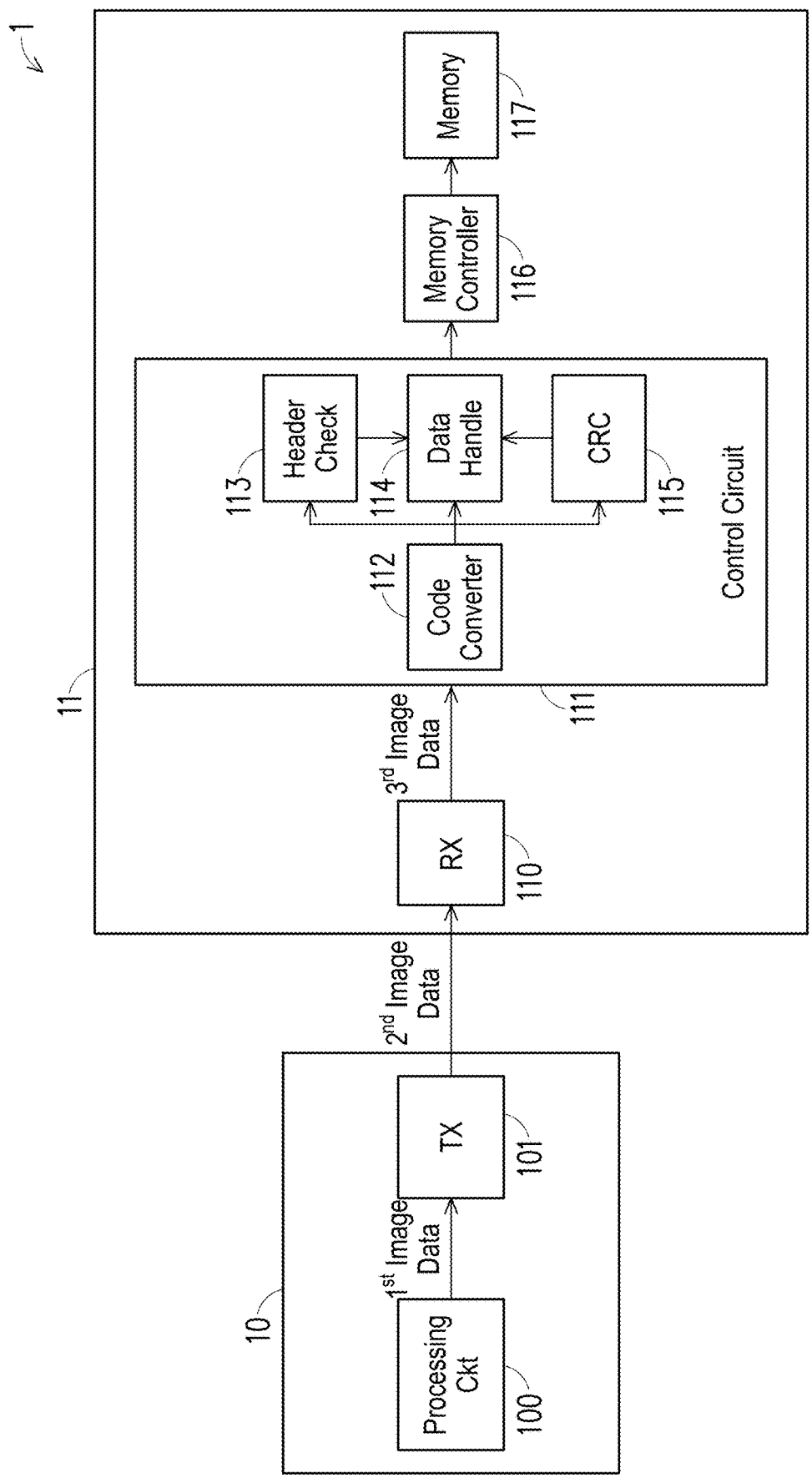
FIG. 1 illustrates an image transmission system in accordance with some embodiments of the present disclosure.

FIG. 1 illustrates an image transmission system 1 in accordance with some embodiments of the present disclosure. The image transmission system 1 includes an image transmitting device 10 and an image display device 11. The image transmitting device 10 is configured to provide a second image data to the image display device 11. The image display device 11 is configured to receive and display according to the second image data.

In normal operations, the image transmitting device 10 is configured to provide the second image data to the image display device 11 for display. In addition to normal operations, the image transmitting device 10 further provides update instructions to the image display device 11 for updating a setting file stored within a memory 117 of the image display device 11. Particularly, the setting file may be, for example but not limited to, a read-only-memory (ROM) code, a ROM patch, a firmware code, a combination of the above, or the like. The image display device 11 may be configured to utilize the second image data for updating data stored in the memory 117. In other words, the update to the memory 117 of the image display device 11 may be performed using a transmission path of the image data instead of a specific data port, such as but not limited to, UART, USB 3.0, SATA, I²C (Inter-Integrated Circuit), etc., or the like. In this way, the update to the memory 117 of the image display device 11 may be simplified and performed without setting up additional physical connections to the image display device 11, saving update time, cost, and errors that may occur when establishing additional physical connections for updates.

The image transmitting device 10 includes a processing circuit 100 and a transmitter 101. The processing circuit 100 is configure to encode update instructions required in updates of the memory 117 and package the encoded update instructions as a first image data. The transmitter 101 is configured to receive the first image data and perform an image processing operation to transform the image data into the second image data. Further, the second image data will be provided to the image display device 11 for display. The image processing operation in transmitter 101 performed on the first image data may be, for example but not limited to, an image compression operation, an image enhancement, a data depth dithering operation, or the like.

Specifically, the first image data is utilized to instruct a plurality of pixels arranged in rows and columns on a display panel (not illustrated in FIG. 1) for display. Usually, the first image data comprises a plurality of brightness data, and each brightness data is configured to control a brightness of each pixel to be displayed. Break down into pixel level, each pixel further comprises a plurality of subpixels respectively configured to display different colors, such as red, green, blue (RGB), or cyan, magenta, yellow, black (CMYK). Corresponding to the subpixels inside each pixel, each brightness data also includes a plurality subpixel brightness data respectively for controlling brightness displayed by the subpixels of the corresponding pixel.

In some embodiments, the processing circuit 100 is configured to set the subpixel brightness data as a first brightness value or a second brightness value according to an update code. Usually, the brightness value of a subpixel may be set at a value within a brightness range, for example 0-255. The first brightness value and the second brightness value may be set as two brightness values respectively falling within a first brightness range and a second brightness range. Further, the first and second brightness values may be set as ranged further than a predetermined variation. Then, the processing circuit 100 is configured to combine the subpixel brightness data set at the first or the second brightness values as brightness data, and further as the first image data.

The transmitter 101 is configured to receive the first image data and perform the image processing operation on the first image data to generate the second image data. The image processing operation may include, for example but not limited to, an image compression operation, an image enhancement, a data depth dithering operation, or the like, which allows the second image data to be transmitted in a specific or designated data type, or in a more efficient way. For example, the transmitter 101 may be a serializer circuit.

The image display device 11 includes a receiver 110, a control circuit 111, a memory controller 116, and a memory 117. The receiver 110 may be configured to perform an image restoration operation on the second image data, which may be, for example but not limited to, a decompression, a deserialization operation, or the like. The receiver 110 may be, for example but not limited to, a deserializer circuit configured to decompress and deserialize the received second image data into a specific and compatible data type to generate a third image data. After deserialization, the restored third image data has the same datatype as the first image data, formed by a plurality of pixel brightness data, and each pixel brightness data further comprising a plurality of subpixel brightness data. But the image content or image data bit depth may be different between first image data and third image data.

The control circuit 111 includes a code converter 112, a header check circuit 113, a data handle circuit 114, and a cyclic redundancy check (CRC) circuit 115. The code converter 112 is configured to convert each subpixel brightness data in the third image data into a corresponding update code. Specifically, after the processing image operation and the image restoration operation respectively performed by the transmitter 101 and the receiver 110, the brightness value of each subpixel brightness data in the third image data may deviate slightly from its original value in the first image data due to the sake of distortion or efficiency transmission. However, since the brightness value of each subpixel brightness data are set the first brightness value or the second brightness value, and a difference between the first and second brightness values is greater than the predetermined variation, the variation induced by the image processing operation and the image restoration operation on the first and the second image data will be less than the predetermined variation. In other words, the brightness values of the corresponding subpixel brightness data of the first image data and the third image data will fall within the same brightness range. Therefore, the code converter 112 may be configured to use a brightness threshold value to determine a bit value of the update code according to what brightness range the brightness value of the subpixel brightness data falls in.

In some embodiments, the control circuit 111 may be a timing controller (TCON), a processor, a micro-control unit (MCU), a graphic processing unit (GPU), a processor based on advanced RISC machine (ARM), or the like. In addition, the control circuit 111 may also be implemented through synthesis using hardware description language (HDL), such as high-speed hardware description language (VHDL), verilog or the like. The memory 117 may be a flash memory or a nonvolatile memory and can be inside or outside the circuit FIG. 2 illustrates a first example of a signal diagram of a first image data, a second image data, and a third image data in accordance with some embodiments of the present disclosure.

In FIG. 2, each pixel comprises three subpixels used to respectively emit red, green, and blue colors, and such example is just for illustrative purposes rather than restrictive. As can be seen in the first row in FIG. 2, each brightness value of each subpixel of the first image data is set at the first brightness value 255 or the second brightness value 0. As can be seen in the second row in FIG. 2, after the image processing operation and the image restoration operation are performed, brightness values of the third image data deviate slightly from the first brightness value 255 and the second brightness value 0. However, the deviated subpixel brightness data of the third image data still falls within the same brightness range as the corresponding subpixel brightness data of the first image data. The first brightness range and the second brightness range are separated and non-overlapping. Moreover, the first and second brightness ranges are divided by the brightness threshold value, so that the code converter 112 may be configured to compare the subpixel brightness data with the brightness threshold value to generate the update code.

In this example, when the first brightness value and the second brightness value are respectively 255 and 0, the brightness threshold value may be selected as 128. Affected by the transmitter 101 and the receiver 110, the first brightness value of the third image data will fall in the brightness range between 128-255, and the second value of the third image data will fall in the brightness range between 0-127. However, the code converter 112 may be configured to generate the update code as a first bit value 1 when the subpixel brightness data is greater than or equal to the brightness threshold value 128, and generate the update code as a second bit value 0 when the subpixel brightness data is less than the brightness threshold value 128. In this way, the code converter 112 may be configured to convert the subpixel brightness data as the update codes according to which brightness range the subpixel brightness data falls in. As a result, the code converter 112 may be configured to convert each row display data of the third image data into an update instruction.

FIG. 3 illustrates a second example of a signal diagram of a first image data, a second image data, and a third image data in accordance with some embodiments of the present disclosure.

In FIG. 3, each pixel comprises three subpixels used to respectively emit red, green, and blue colors, and such example is just for illustrative purposes rather than restrictive. As can be seen in the first row in FIG. 3, each subpixel brightness data of the first image data is set at the first brightness value 255 or the second brightness value 0. However, in this embodiment, the three subpixel brightness data of the same pixel brightness data set as a same brightness value to represent one update code. Specifically, the three subpixel brightness data of the first pixel in the first row in FIG. 3 are all set to 255 representing the bit value 1, the three subpixel brightness data of the second pixel in the first row in FIG. 3 are all set to 0 representing the bit value 0, and the three subpixel brightness data of the third pixel in the first row in FIG. 3 are all set to 255 representing the bit value 1. In this way, as can be seen in the second and third rows in FIG. 3, the code converter 112 may be configured to set the first update code as the first bit value 1 when all of the three subpixel brightness data of the first pixel of the third image data are greater than or equal to the brightness threshold value 128, and set the second update code as the second bit value 0 when all of the three subpixel brightness data of the second pixel of the third image data are less than the brightness threshold value 128, and so on. In this way, the code converter 112 may be configured to use all subpixel brightness data of the same pixel to generate the update code, further reducing bit error rate occurred in the update code.

FIG. 4 illustrates a third example of a signal diagram of a first image data, a second image data, and a third image data in accordance with some embodiments of the present disclosure.

In FIG. 4, each pixel comprises three subpixels used to respectively emit red, green, and blue colors, and such example is just for illustrative purposes rather than restrictive. As can be seen in the first row in FIG. 4, each subpixel brightness data of the first image data is set at the first brightness value 255 or the second brightness value 0. However, in this embodiment, the subpixel brightness data of a plurality of consecutive pixels are set at a same brightness value to represent one update code. Specifically, the subpixel brightness data of the first to third pixels in the first row in FIG. 4 are all set to 255 representing the bit value 1, and the subpixel brightness data of the fourth to sixth pixels in the first row in FIG. 4 are all set to 0 representing the bit value 0. In this way, as can be seen in the second and third rows in FIG. 3, the code converter 112 may be configured to set the first update code as the first bit value 1 when all subpixel brightness data of the first to third pixels of the third image data are greater than or equal to the brightness threshold value 128, and set the second update code as the second bit value 0 when all subpixel brightness data of the fourth to sixth pixels of the third image data are less than the brightness threshold value 128, and so on. In this way, the code converter 112 may be configured to use all subpixel brightness data of the same pixel to generate the update code in a more robust way.

FIG. 5 illustrates a fourth example of a signal diagram of a first image data, a third image data, and update codes in accordance with some embodiments of the present disclosure.

In FIG. 5, each pixel comprises three subpixels used to respectively emit red, green, and blue colors of light, and such example is just for illustrative purposes rather than restrictive. In this embodiment, each subpixel brightness data may be used to represent two bits of an update code. Specifically, the brightness range 0-255 may be divided into four ranges 0-63, 64-127, 128-191, 192-255, and each subpixel brightness data of the first image may be set as one of the four brightness values 0, 96, 160, 255 respectively falling within the four ranges. In this embodiment, the brightness threshold values may be selected as 64, 128, 192, so that the three brightness threshold values may divide the overall brightness ranges into three brightness ranges with equal length.

As can be seen in the first row in FIG. 5, all subpixel brightness data of the first pixel of the first image data are set to the brightness value 255 representing a bit value 11 of a first update code. All subpixel brightness data of the second pixel of the first image data are set to the brightness value 0 representing a bit value 00 of a second update code. All subpixel brightness data of the third pixel of the first image data are set to the brightness value 96 representing a bit value 01 of a third update code. All subpixel brightness data of the fourth pixel of the first image data are set to the brightness value 160 representing a bit value 10 of a fourth update code. In this way, the code converter 112 may be configured to convert the subpixel brightness data to obtain multiple bits of the update code, increasing data volume.

In this embodiment, the differences between the brightness values 0, 96, 160, 255 of the subpixel brightness data are large enough so that the variation induced during the image processing and image restoration operation still cannot affect the brightness values originally written in to enter the adjacent brightness range. Although in this embodiment, the brightness threshold values are selected to divide the overall brightness range into multiple brightness ranges with equal length, it is also possible that the brightness threshold values are selected to divide the overall brightness range is divided unevenly based on different design concepts and system requirements.

Figure 6:
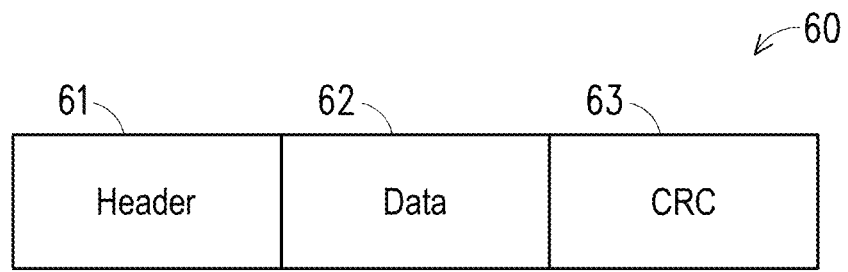
FIG. 6 illustrates an update instruction comprising a plurality of columns in accordance with some embodiments of the present disclosure.

FIG. 6 illustrates an update instruction 60 comprising a plurality of columns in accordance with some embodiments of the present disclosure. As described in paragraphs above, each row display data of the image data may be converted as a corresponding update instruction 60. The update instruction includes a header column 61, a data column 62, and a cyclic redundancy check (CRC) column 63. Please refer to FIGS. 1 and 6 together for better understanding the following paragraphs in relation to operations of the control circuit 111.

The header check circuit 113 is configured to access data stored in the header column 61 of the third image data. Specifically, the header column 61 carries an information about whether such instruction is used for updating the setting file. If the header check circuit 113 confirms that such instruction is the update instruction used for updating the setting file stored in the memory 117, the header check circuit 113 may accordingly sent out a header confirmed signal to the data handle circuit 114, informing the data handle circuit 114 that the received instruction is an update instruction. Further, the CRC circuit 115 is configured to check the CRC column 63 to see whether the data carried in the update instruction is correct. Usually, the CRC column 63 is configured to carry a CRC code generated by the whole bit string using the CRC algorithm. The CRC circuit 115 may check the CRC code with the overall data bit string of the update instruction to see whether there is error occurred in the update instruction. Once the CRC circuit 115 verifies that the bit string of the update instruction conforms to the CRC code, the CRC circuit 115 may be configured to send out a CRC confirmed signal to the data handle circuit 114, informing that the data of such update instruction is correct. After receiving the header confirmed signal and the CRC confirmed signal by the data handle circuit 114, the data handle circuit 114 may be configured to trigger the memory controller 16 to update the setting file stored in the memory 117 using the update instruction.

As a result, the image transmission system 1 allows the image display device 11 to receive and update the setting file stored in the memory 117 using an exited signal path without setting up additional physical connections, saving update time, cost, and errors that may occur when establishing additional physical connections for updates. For example, the image display device 11 may be an automotive electronic so that updating the setting file is usually required to set up a physical connection to the automotive electronic.

Figure 7:
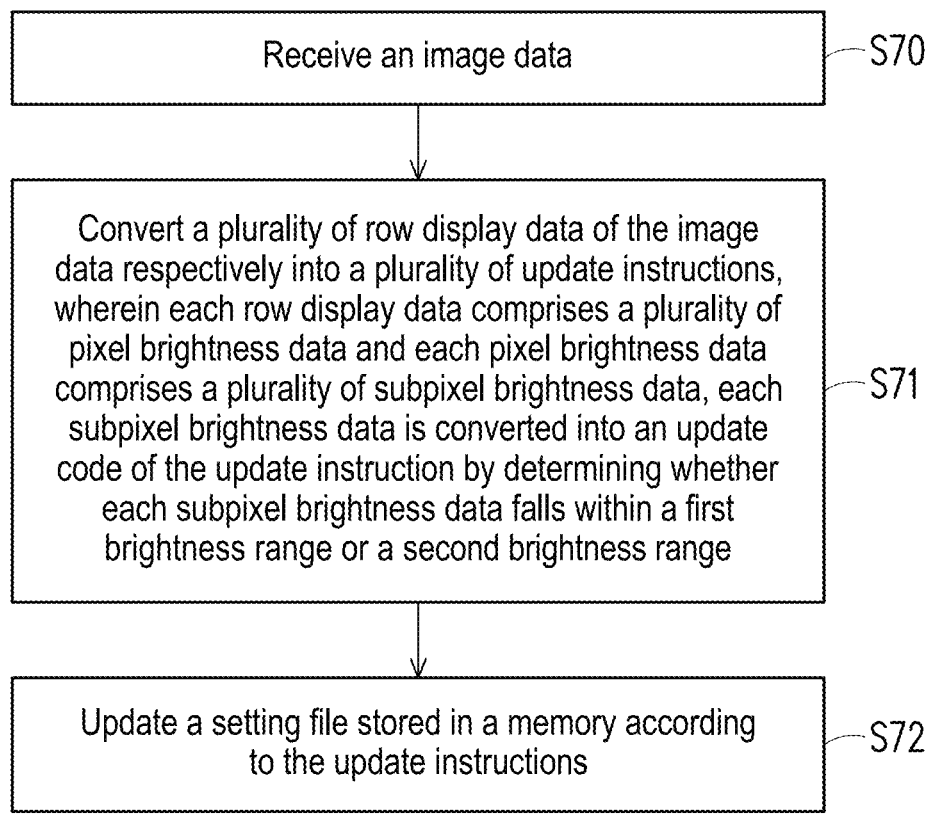
FIG. 7 illustrates a flowchart of an updating method of an image display device in accordance with some embodiments of the present disclosure.

FIG. 7 illustrates a flowchart of an updating method of an image display device in accordance with some embodiments of the present disclosure. The update method may be applied to update the image display device 11 in FIG. 1. The update method includes steps S70-S72.

At step S70, the receiver 110 may be configured to receive an image data. The receiver 110 may be configured to perform an image restoration operation on the received image data. The image restoration operation which may be, for example but not limited to, a decompression, a deserialization operation, or the like.

At step S71, the code converter 112 of the control circuit 111 may be configured to convert a plurality of row display data of the image data respectively into a plurality of update instructions. Specifically, each row display data comprises a plurality of pixel brightness data and each pixel brightness data comprises a plurality of subpixel brightness data. The code converter 112 is configured to convert each subpixel brightness data into an update code of the update instruction by determining whether each subpixel brightness data falls within a first brightness range or a second brightness range.

At step S72, a memory controller 116 may be triggered and configured to update a setting file stored in the memory 117 according to the update instructions.

Please refer to paragraphs above for more details about operations of the image display device 11, which is omitted herein.

In summary, the image transmission system allows the image display device to receive and update the setting file stored in the memory using an exited signal path without setting up additional physical connections, saving update time, cost, and errors that may occur when establishing additional physical connections for updates.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An updating method for updating an image display device, the updating method comprising:
    receiving an image data;
    converting a plurality of row display data of the image data respectively into a plurality of update instructions, wherein each row display data comprises a plurality of pixel brightness data and each pixel brightness data comprises a plurality of subpixel brightness data, each subpixel brightness data is converted into an update code of the update instruction by determining whether each subpixel brightness data falls within a first brightness range or a second brightness range; and
    updating a setting file stored in a memory according to the update instructions.

2. The updating method of claim 1, wherein the first brightness range and the second brightness range are non-overlapping and divided by a brightness threshold value, wherein the update code is generated by comparing the subpixel brightness data with the brightness threshold value to determine which of the brightness ranges the subpixel brightness data falls in.

3. The updating method of claim 2, comprising generating the update code as a first bit value when the subpixel brightness data of a subpixel is greater than or equal to the brightness threshold value, and generating the update code as a second bit value when the subpixel brightness data is less than the brightness threshold value.

4. The updating method of claim 2, comprising generating the update code as a first bit value when all subpixel brightness data of a same pixel are greater than or equal to the brightness threshold value, and generating the update code as a second bit value when all of the subpixel brightness data of the same pixel are less than the brightness threshold value.

5. The updating method of claim 2, comprising generating the update code as a first bit value when all subpixel brightness data of a plurality of consecutive pixels are greater than or equal to the brightness threshold value, and generating the update code as a second bit value when all of the subpixel brightness data of the consecutive pixels are less than the brightness threshold value.

6. The updating method of claim 2, comprising comparing the subpixel brightness data with brightness values to generate one bit of the update code.

7. The updating method of claim 1, comprising comparing the subpixel brightness data with a plurality of brightness values to generate a plurality of bits of the update code.

8. The updating method of claim 1, comprising:
    checking a data stored in a header column of the update instruction to determine whether the update instruction is used to update the memory; and checking a data stored in a cyclic redundancy check (CRC) column of the update instruction to determine whether the update instruction is correct.

9. An image display device, comprising:
a memory configured to store a setting file of the image display device;
a control circuit configured to receive an image data, the control circuit comprising:
a code converter configured to convert a plurality of row display data of the image data respectively into a plurality of update instructions, wherein each row display data comprises a plurality of pixel brightness data and each pixel brightness data comprises a plurality of subpixel brightness data, each subpixel brightness data is converted into an update code of the update instruction by determining whether each subpixel brightness data falls within a first brightness range or a second brightness range; and
a memory controller configured to update the setting file according to the update code.

10. The image display device of claim 9, wherein the first brightness range and the second brightness range are non-overlapping and divided by a brightness threshold value, the code converter is configured to generate the update code by comparing the subpixel brightness data with the brightness threshold value to determine which of the brightness ranges the subpixel brightness data falls in.

11. The image display device of claim 10, wherein the code converter is configured to generate the update code as a first bit value when the subpixel brightness data of a subpixel is greater than or equal to the brightness threshold value, and generate the update code as a second bit value when the subpixel brightness data is less than the brightness threshold value.

12. The image display device of claim 10, wherein the code converter is configured to generate the update code as a first bit value when all subpixel brightness data of a same pixel are greater than or equal to the brightness threshold value, and generate the update code as a second bit value when all of the subpixel brightness data of the same pixel are less than the brightness threshold value.

13. The image display device of claim 10, wherein the code converter is configured to generate the update code as a first bit value when all subpixel brightness data of a plurality of consecutive pixels are greater than or equal to the brightness threshold value, and generate the update code as a second bit value when all of the subpixel brightness data of the consecutive pixels are less than the brightness threshold value.

14. The image display device of claim 10, wherein the code converter is configured to compare the subpixel brightness data with brightness values to generate a single bit of the update code.

15. The image display device of claim 9, wherein the code converter is further configured to compare the subpixel brightness data with a plurality of brightness values to generate a plurality of bits of the update code.

16. The image display device of claim 9, wherein the control circuit comprises:
a header check circuit configured to check a data stored in a header column of the update instruction to determine whether the update instruction is used to update the memory.

17. The image display device of claim 16, wherein the control circuit further comprises:
a cyclic redundancy check (CRC) circuit configured to check a data stored in a CRC column of the update instruction to determine whether the update instruction is correct.

18. The image display device of claim 17, wherein the control circuit comprises:
a data handle circuit coupled to the header circuit and the CRC circuit, the data handle circuit being configured to trigger the memory controller updating the memory after confirmations are received from the header check circuit and the CRC circuit.

19. The image display device of claim 9, wherein the setting file includes a firmware code, a configuration file or a combination of the firmware code and the configuration file.

20. An image transmission system, comprising:
an image transmitting device, comprising:
a processing circuit configured to set each subpixel brightness data of a first image data as a first brightness value or a second brightness value according to an update code; and
a transmitter configured to perform an image processing operation to convert the first image data into a second image data;
an image display device, comprising:
a receiver configured to perform an image restoration operation on the second image data to generate a third image data having a same data type as the first image data;
a control circuit configured to receive the third image data, and configured to determine whether each subpixel brightness data falls within a first brightness range or a second brightness range to recover the update code; and
a memory controller configured to update a setting file stored in a memory according to the update code.

21. The image transmission system of claim 20, wherein the first brightness value in the first image data is converted into a first converted brightness value falling within the first brightness range in the third image data, and the second brightness value in the first image data is converted into a second converted brightness value falling within the second brightness range in the third image data,
wherein the first brightness range and the second brightness range are non-overlapping and divided by a brightness threshold value.

* * * * *